(12) United States Patent
Chang et al.

(10) Patent No.: US 9,367,187 B2
(45) Date of Patent: Jun. 14, 2016

(54) TOUCH PANEL

(71) Applicant: TPK Touch Systems (Xiamen) Inc., Xiamen (CN)

(72) Inventors: Chen-Hsin Chang, Taoyuan (TW); Bin Zhong, Xiamen (CN); Fuding Wang, Quanzhou (CN); Lixian Chen, Xiamen (CN); Tianyan Wang, Fuzhou (CN)

(73) Assignee: TPK Touch Systems (Xiamen) Inc., Xiamen (CN)

( * ) Notice: Subject to any disclaimer, the term of this patent is extended or adjusted under 35 U.S.C. 154(b) by 0 days.

(21) Appl. No.: 14/064,180

(22) Filed: Oct. 27, 2013

(65) Prior Publication Data

US 2014/0118280 A1    May 1, 2014

(30) Foreign Application Priority Data

Oct. 28, 2012   (CN) .......................... 2012 1 0440077

(51) Int. Cl.
*G06F 3/041*    (2006.01)
*G06F 3/044*    (2006.01)

(52) U.S. Cl.
CPC ................ *G06F 3/044* (2013.01); *G06F 3/041* (2013.01); *G06F 3/0412* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 2003/0011577 | A1* | 1/2003 | Katsuki et al. | 345/173 |
| 2010/0163394 | A1* | 7/2010 | Tang et al. | 200/600 |
| 2011/0267302 | A1* | 11/2011 | Fasshauer | 345/174 |
| 2011/0273382 | A1* | 11/2011 | Yoo et al. | 345/173 |
| 2012/0032927 | A1* | 2/2012 | Kim | 345/176 |
| 2013/0016054 | A1* | 1/2013 | Cheong et al. | 345/173 |
| 2013/0194759 | A1* | 8/2013 | Kang | H05K 1/181 361/748 |
| 2013/0278513 | A1* | 10/2013 | Jang | 345/173 |
| 2013/0342475 | A1* | 12/2013 | Lee et al. | 345/173 |

* cited by examiner

*Primary Examiner* — Jason Olson
*Assistant Examiner* — Sosina Abebe
(74) *Attorney, Agent, or Firm* — Gokalp Bayramoglu; Paul Bendemire

(57) ABSTRACT

A touch panel having at least one non-right angle corner region on a corner of the touch panel is provided. The touch panel includes a first electrode and a second electrode. The first electrode crosses the second electrode, and the first electrode is electrically isolated from the second electrode. The first electrode includes a plurality of first stripe electrodes extending along a first direction. The second electrode includes a plurality of second stripe electrodes and at least one auxiliary electrode. The second stripe electrodes extend along a second direction. The auxiliary electrode is disposed on the non-right angle corner region. An included angle between the auxiliary electrode and the second direction is less than 90 degrees. The auxiliary electrode is electrically connected to at least one of the second stripe electrodes adjacent to the auxiliary electrode.

20 Claims, 6 Drawing Sheets

TOUCH PANEL

BACKGROUND OF THE INVENTION

All related applications are incorporated by reference. The present application is based on, and claims priority from, China Application Serial Number No. 2012100440077.1, filed on Oct. 28, 2012, the disclosure of which is hereby incorporated by reference herein in its entirety.

FIELD OF THE INVENTION

The present invention relates to an input interface, and more particularly, to a touch panel.

DESCRIPTION OF THE PRIOR ART

In the recent years, touch display panels having both a touch sensing function and a display function have been widely applied in many kinds of electronic products such as mobile phone, global positioning system (GPS) navigator system, table personal computer (PC), personal digital assistant (PDA) and laptop PC. Many diverse technologies of touch panel exist, and the resistance touch technology, the capacitive touch technology and the optical touch technology are the main touch technologies which are in use. The capacitive touch technology has become the mainstream touch technology for the high-end and the mid-end consumer electronics, because the capacitive touch panels have advantages such as high precision, multi-touch properties, better endurance, and higher touch sensing resolution.

The capacitive touch panels can be categorized into self capacitive touch panels and mutual capacitive touch panels (i.e. projected capacitive touch panels). The mutual capacitive touch panels usually include vertical electrodes and horizontal electrodes respectively connected to touch signal delivering elements and touch signal sensing and controlling elements to form a capacitive matrix. In order to enhance the appearance of the touch panels or to better fit the shape of the display panels or the arrangement of the virtual keys, the corners of the touch panel may be designed to include bevel angles or non-right angle shapes, and some vertical electrodes and horizontal electrodes around the corners may be removed to meet the design requirements of the corner shape. Accordingly, the capacitance produced in the corner including bevel angles or non-right angle shapes may decrease, and the touch sensitivity of the corner including bevel angles or non-right angle shapes may be reduced.

SUMMARY OF THE DISCLOSURE

It is therefore one of the objectives of the present invention to provide a touch panel and an auxiliary electrode disposed on the non-right angle corner region of the touch panel, in order to increase the capacitance and improve the touch sensitivity on the non-right angle corner region of the touch panel.

According to one exemplary embodiment of the present invention, a touch panel having at least one non-right angle corner region on a corner of the touch panel is provided. The touch panel includes a first electrode and a second electrode. The first electrode includes a plurality of first stripe electrodes extending along a first direction. The second electrode includes a plurality of second stripe electrodes and at least one auxiliary electrode. The second stripe electrodes extend along a second direction crossing the first direction and the second electrode is electrically isolated from the first electrode. The auxiliary electrode is disposed on the non-right angle corner region. An included angle between at least a part of the auxiliary electrode and the second direction is substantially less than 90 degrees, and the auxiliary electrode is electrically connected to at least one of the second stripe electrodes adjacent to the auxiliary electrode.

The disposition of the auxiliary electrode electrically connected to the second stripe electrode can increase the overlapped area between the first electrode and the second electrode; accordingly, the capacitance exhibited on the non-right angle corner region of the touch panel can increase, thereby improving the touch sensitivity on the non-right angle corner region of the touch panel.

These and other objectives of the present invention will no doubt become obvious to those of ordinary skill in the art after reading the following detailed description of the preferred embodiment which is illustrated in the various figures and drawings provided below.

DETAILED DESCRIPTION OF THE EMBODIMENTS

Figure 1:
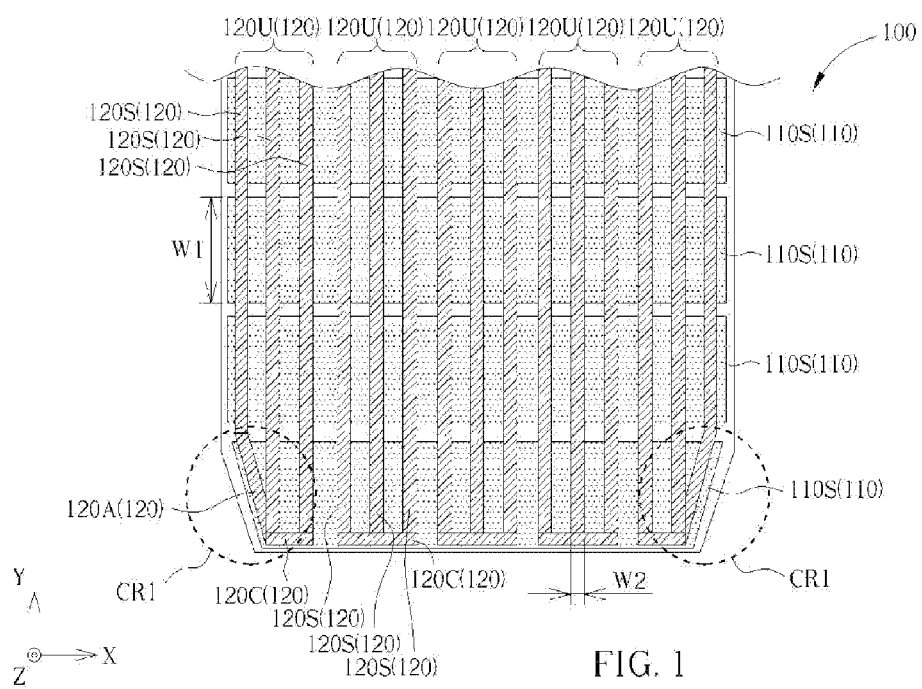
FIG. 1 is a schematic diagram illustrating a touch panel according to a first preferred embodiment of the present invention.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 2:
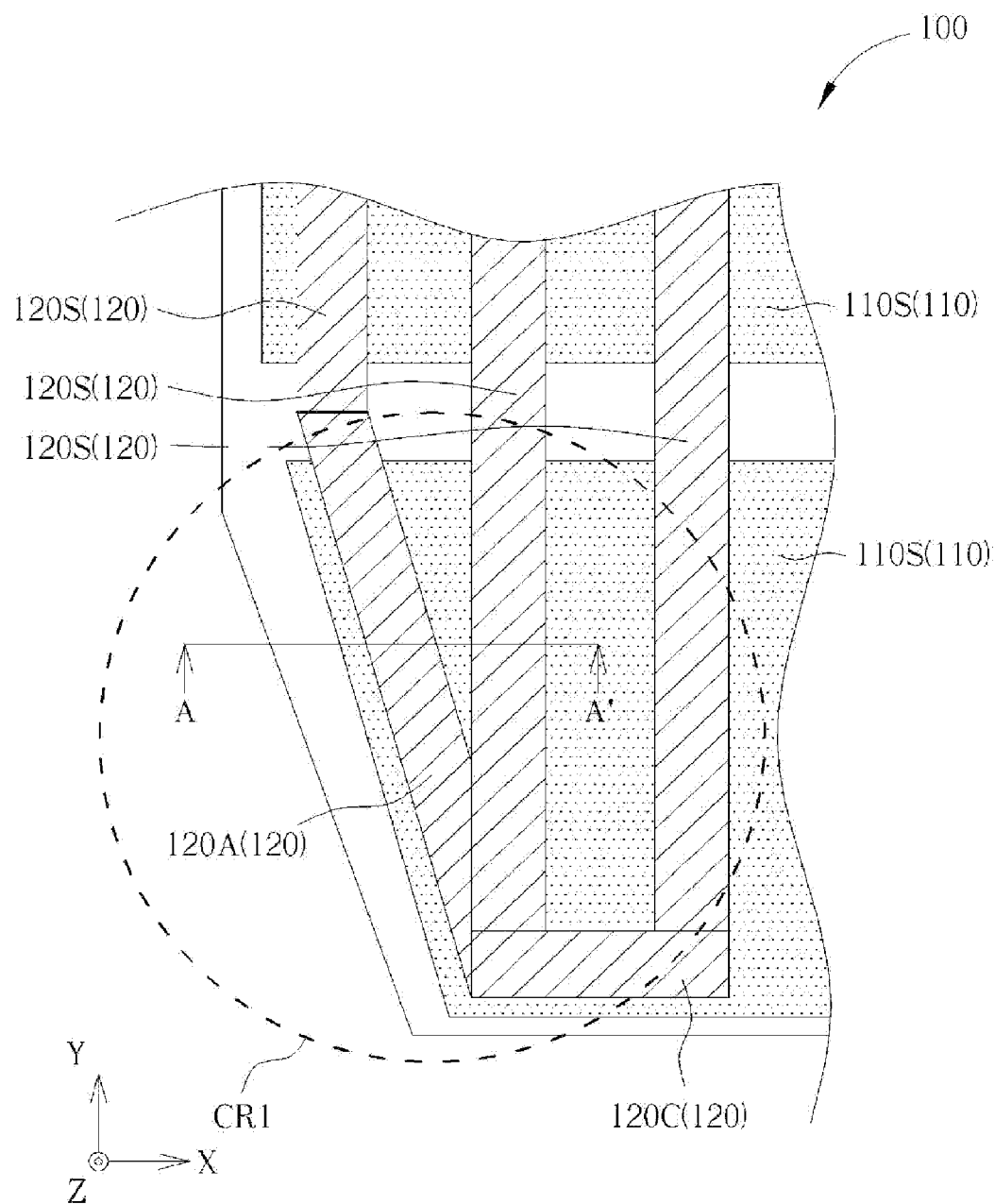
FIG. 2 is an enlarged schematic diagram of a part of FIG. 1.
Figure 3:
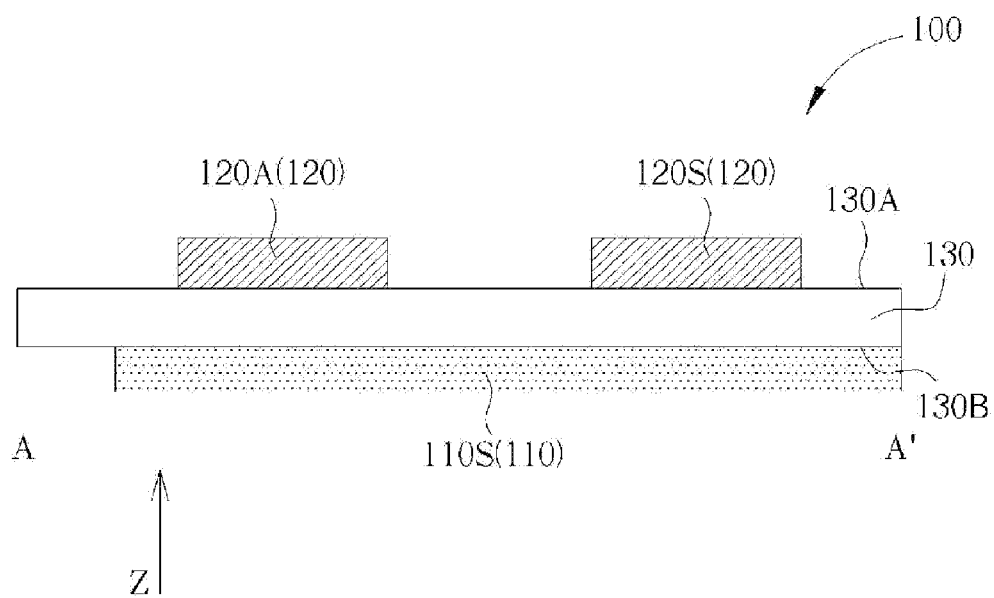
FIG. 3 is a cross-sectional view diagram taken along a cross-sectional line A-A' in FIG. 2.

Please refer to FIG. 1 through FIG. 3. FIG. 1 is a schematic diagram illustrating a touch panel according to a first preferred embodiment of the present invention. FIG. 2 is an enlarged schematic diagram of a part of FIG. 1. FIG. 3 is a cross-sectional view diagram taken along a cross-sectional line A-A' in FIG. 2. Please note that the figures are only for illustration and the figures may not be to scale. The scale may be further modified according to different design considerations. As shown in FIG. 1, in this exemplary embodiment, a touch panel 100 is provided, wherein the touch panel 100 has at least one non-right angle corner region CR1 on a corner of the touch panel 100. More specifically, the touch panel 100 includes two non-right angle corner regions CR1 respectively disposed on two corners of the touch panel 100, but not limited thereto. A plurality of non-right angle corner regions CR1 could be disposed in any proper location of the touch panel 100 according to requirements. As illustrated in FIG. 1 through FIG. 3, the touch panel 100 includes a first electrode 110 and a second electrode 120. The first electrode 110 and the second electrode 120 cross each other and are electrically isolated from each other. The first electrode 110 includes a plurality of first stripe electrodes 110S extending along a first direction X, while the second electrode 120 includes a plurality of second stripe electrodes 120S extending along a second direction Y and at least one auxiliary electrode 120A, and the second direction Y crosses the first direction X. A length of the second stripe electrode 120S on the non-right angle corner region CR1 is relatively shorter than a length of the other second stripe electrode 120S. The auxiliary electrode 120A is disposed on the non-right angle corner region CR1. Furthermore, an included angle between at least a part of the auxiliary electrode 120A and the second direction Y is substantially less than 90 degrees, and the auxiliary electrode 120A is electrically connected to at least one of the second stripe electrodes 120A adjacent to the auxiliary electrode 120S.

In this exemplary embodiment, each of the first stripe electrodes 110S could be taken as a horizontal electrode, each of the second stripe electrodes 120S could be taken as a vertical electrode, and the first direction X is preferably perpendicular to the second direction Y, but not limited thereto. Each of the first stripe electrodes 110S and each of the second stripe electrodes 120S are arranged to cross and overlap each other and form a capacitive matrix in the touch panel 100. When a touch object, such as a finger, touches the touch panel 100, the change in the capacitance in each of the regions in the capacitive matrix is detected, and the function of touch sensing and positioning can be completed. The first electrode 110 preferably serves as a touch signal driving electrode and the second electrode 120 preferably serves as a touch signal sensing electrode to preferably operate the touch panel 100 in a mutual capacitive driving way, but not limited thereto. The touch panel 100 could also be driven by the second electrode 120 serving as a touch signal sensing electrode and the first electrode 110 serving as a touch signal driving electrode, or through other driving ways. It is appreciated that each of the second stripe electrodes 120S can not continuously extend along the second direction Y on the non-right angle corner region CR1; therefore, the overlapped area between the second stripe electrodes 120S and the first electrode 110 on the non-right angle corner region CR1 is substantially smaller than that on the other region outside the non-right angle corner region CR1. Accordingly, the disposition of the auxiliary electrode 120A connected to the second stripe electrode 120S is designed in this exemplary embodiment to increase the overlapped area between the second electrode 120 and the first electrode 110 on the non-right angle corner region CR1, and the capacitance exhibited on the non-right angle corner region CR1 can be further increased, thereby improving the touch sensitivity on the non-right angle corner region CR1 of the touch panel 100.

It is noted that, a width W2 of each of the second stripe electrodes 120S is substantially smaller than a width W1 of each of the first stripe electrodes 110S, when the first electrode 110 serves as the driving electrode and the second electrode 120 serves as the sensing electrode. The coupled capacitance between the first electrode 110 and the second stripe electrodes 120S having the smaller width may be comparatively smaller; therefore, the consumed time for discharging the coupled capacitance between the first electrode 110 and the second electrode 120 would not be too long. In other words, when the frequency of the driving signal of the first electrode 110 is higher, delay for delivering the sensing signal produced by the second electrode 120 can be avoided.

In this exemplary embodiment, the non-right angle corner region CR1 is a bevel corner region, but not limited thereto; the non-right angle corner region could be an arc corner region or an irregularly shaped corner region, according to design requirements. The shape of the auxiliary electrode 120A is preferably modified correspondingly to the shape of the non-right angle corner region CR1, and an included angle between at least a part of the auxiliary electrode 120A and the second direction Y is preferably substantially less than 90 degrees. For example, the auxiliary electrode 120A in this exemplary embodiment is a stripe electrode, and an included angle between the auxiliary electrode 120A and the first direction X or an included angle between the auxiliary electrode 120A and the second direction Y is substantially not equal to 90 degrees, but not limited thereto. In other exemplary embodiments, the auxiliary electrode could be an arc auxiliary electrode, an irregularly shaped auxiliary electrode, or other proper shaped auxiliary electrode.

In addition, as shown in FIG. 1, the second electrode 120 may further include at least one connecting electrode 120C, and the connecting electrode 120C is electrically connected to at least two adjacent second stripe electrodes 120S. More specifically, the adjacent second stripe electrodes 120S can be electrically connected to each other through the connecting electrode 120C to uniform the electrical performance of the driven second electrodes 120. The connecting electrode 120C is preferably disposed extending along the first direction X, but not limited thereto. Furthermore, the connecting electrode 120C is preferably disposed adjacent to a bonding region (not shown) for external elements of the touch panel 100, but not limited thereto. In other exemplary embodiments, the connecting electrode could be disposed far away to the bonding region (not shown) for external elements of the touch panel.

It is further appreciated that the second electrode 120 includes a plurality of second electrode sets 120U, and each of the second electrode sets 120U includes three adjacent second stripe electrodes 120S and a corresponding connecting electrode 120C. More specifically, in this exemplary embodiment, a part of the second electrode sets 120U respectively include three adjacent second stripe electrodes 120S and a connecting electrode 120C connected to the three adjacent second stripe electrodes 120S, and the second electrode sets 120U on the non-right angle corner region CR respectively include three adjacent second stripe electrodes 120S, a connecting electrode 120C connected to the three adjacent second stripe electrodes 120S, and an auxiliary electrode 120A, but not limited thereto. In other exemplary embodiments, the second electrode sets may respectively include two adjacent second stripe electrodes 120S and a corresponding connecting electrode 120C.

As shown in FIG. 2 and FIG. 3, the touch panel 100 further includes a first substrate 130 made of insulating materials. The material of the first substrate 130 could be selected from glass, polyethylene terephthalate (PET), polymethylmethacrylate (PMMA), polycarbonate (PC), etc. The first electrode 110 and the second electrode 120 are respectively disposed on two opposite surfaces of the first substrate 130 and electrically isolated from each other. Each of the first stripe electrodes 110S and each of the second stripe electrodes 120S at least partially overlaps each other in a direction Z which is perpendicular to the first substrate 130. More specifically, the first substrate 130 has an upper surface 130A and a lower surface 130B opposite to the upper surface 130A, the first electrode 110 could be disposed on the lower surface 130B, and the second electrode 120 could be disposed on the upper surface 130A. The first electrode 110, the second electrode 120 and the insulating first substrate 130 disposed between the first electrode 110 and the second electrode 120 may jointly form the illustrated capacitive matrix. Furthermore, the disposition of the auxiliary electrode 120A aims at facilitating the increase of the overlapped area between the second electrode 120 and the first electrode 110 on the non-right angle corner region CR1; therefore, the capacitance exhibited on the non-right angle corner region CR1 may increase and the touch sensitivity on the non-right angle corner region CR1 of the touch panel 100 can be improved. Additionally, the second stripe electrodes 120S, the auxiliary electrodes 120A and the connecting electrodes 120C of the second electrode 120 are preferably made of the same conductive material in order to simplify the structure and the manufacturing processes, but not limited thereto. In other words, the second stripe electrodes 120S, the auxiliary electrodes 120A and the connecting electrodes 120C in the second electrode 120 are preferably integrally formed without being electrically connected to each other through other mediums. The illustrated conductive material preferably includes transparent conductive material such as indium tin oxide (ITO), indium zinc oxide (IZO) or aluminum zinc oxide (AZO), or opaque conductive material, such as silver (Ag), aluminum (Al), copper (Cu), magnesium (Mg), molybdenum (Mo), a composite layer made of illustrated materials or an alloy made of illustrated materials, but not limited thereto. The first electrode 110 could be made of the illustrated conductive materials as well. Moreover, the first substrate 130 may include a hard substrate such as a glass substrate or a ceramic substrate, a flexible substrate such as a plastic substrate, or a substrate made of other proper materials.

The following description is based on different embodiments of the touch panel of the present invention. To simplify the description, the following description will focus on the differences among embodiments rather than similar parts. Furthermore, the same reference numbers are used in each description of embodiments for the convenience of cross-reference.

Figure 4:
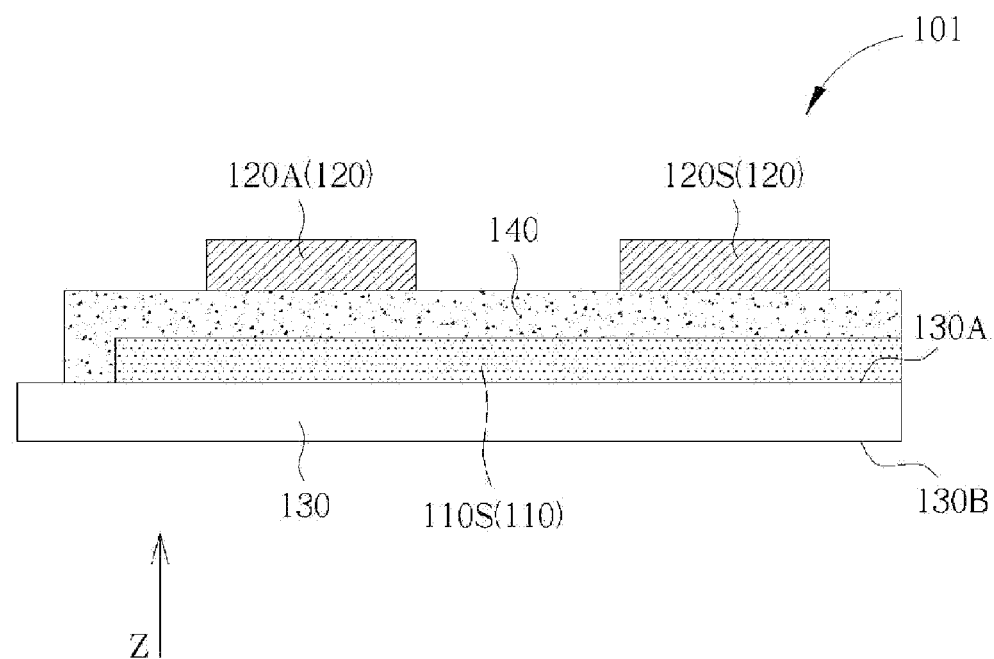
FIG. 4 is a schematic diagram illustrating a touch panel according to a second preferred embodiment of the present invention.

Please refer to FIG. 4. FIG. 4 is a schematic diagram illustrating a touch panel according to a second preferred embodiment of the present invention. As shown in FIG. 4, a touch panel 101 is provided in this exemplary embodiment. The difference between the touch panel 101 and the touch panel 100 of the first preferred embodiment is that the first electrode 110 and the second electrode 120 of the touch panel 101 are disposed on a same surface of the first substrate 130, and the touch panel 101 further includes an insulating layer 140 disposed between the first electrode 110 and the second electrode 120 to electrically isolate the first electrode 110 from the second electrode 120. The first stripe electrode 110S and the second stripe electrode 120S at least partially overlap each other along the direction Z which is perpendicular to the first substrate 130. In the touch panel 101 of this exemplary embodiment, the first electrode 110, the second electrode 120 and the insulating layer 140 disposed between the first electrode 110 and the second electrode 120 may jointly form the illustrated capacitive matrix. Apart from the disposition of the insulating layer 140 and the arrangement of the first electrode 110 and the second electrode 120 in this embodiment, the other components, allocations, material properties and method of activating touch sensing of this embodiment are similar to those of the touch panel 100 in the first preferred embodiment detailed above and will not be redundantly described.

Figure 5:
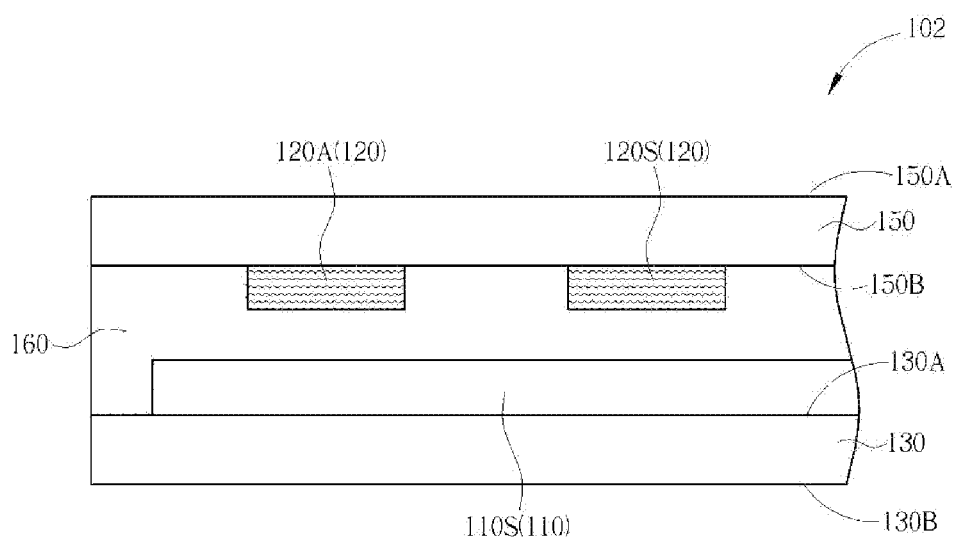
FIG. 5 is a schematic diagram illustrating a touch panel according to a third preferred embodiment of the present invention.

Please refer to FIG. 5. FIG. 5 is a schematic diagram illustrating a touch panel according to a third preferred embodiment of the present invention. As shown in FIG. 5, a touch panel 102 is provided in this exemplary embodiment. The difference between the touch panel 102 and the touch panel 100 of the first preferred embodiment is that the touch panel 102 further includes a second substrate 150 disposed oppositely to the first substrate 130. The first electrode 110 is disposed on the first substrate 130, and the second electrode 120 is disposed on the second substrate 150. The first stripe electrode 110S and the second stripe electrode 120S at least partially overlap each other along the direction Z perpendicular to the first substrate 130. Additionally, the touch panel 102 further includes an adhesive layer 160 disposed between the first substrate 130 and the second substrate 150 to bond the first substrate 130 and the second substrate 150 together. In this exemplary embodiment, the adhesive layer 160 is disposed between the first electrode 110 and the second electrode 120, but not limited thereto. The adhesive layer 160 is commonly an insulating optical adhesive, for example a thermosetting adhesive, a wet setting adhesive, or a light curable adhesive, but not limited thereto. Apart from the disposition of the second substrate 150, the disposition of the adhesive layer 160, and the arrangement of the first electrode 110 and the second electrode 120 in the touch panel 102 in this embodiment, the other components, allocations, material properties and method of activating touch sensing of this embodiment are similar to those of the touch panel 100 in the first preferred embodiment detailed above and will not be redundantly described. It is appreciated that, the first electrode 110 is disposed on a surface of the first substrate 130 facing the second substrate 150, and the second electrode is disposed on a surface of the second substrate 150 facing the first substrate 130. More specifically, the second substrate 150 has an upper surface 150A and a lower surface 150B, and the lower surface 150B of the second substrate 150 faces the upper surface 130A of the first substrate 130. In this exemplary embodiment, the first electrode 110 is disposed on the upper surface 130A of the first substrate 130, and the second electrode 120 is disposed on the lower surface 150B of the second substrate 150, but not limited thereto. In other exemplary embodiments, according to design requirements, the first electrode 110 may be disposed on the lower surface 130B of the first substrate 130, and the second electrode 120 may be disposed on the upper surface 150A of the second substrate 150. The first electrode 110 and the second electrode 120 are electrically insulated and partially overlap each other through the adhesive layer 160 to jointly achieve the effect of the illustrated capacitive matrix.

Figure 6:
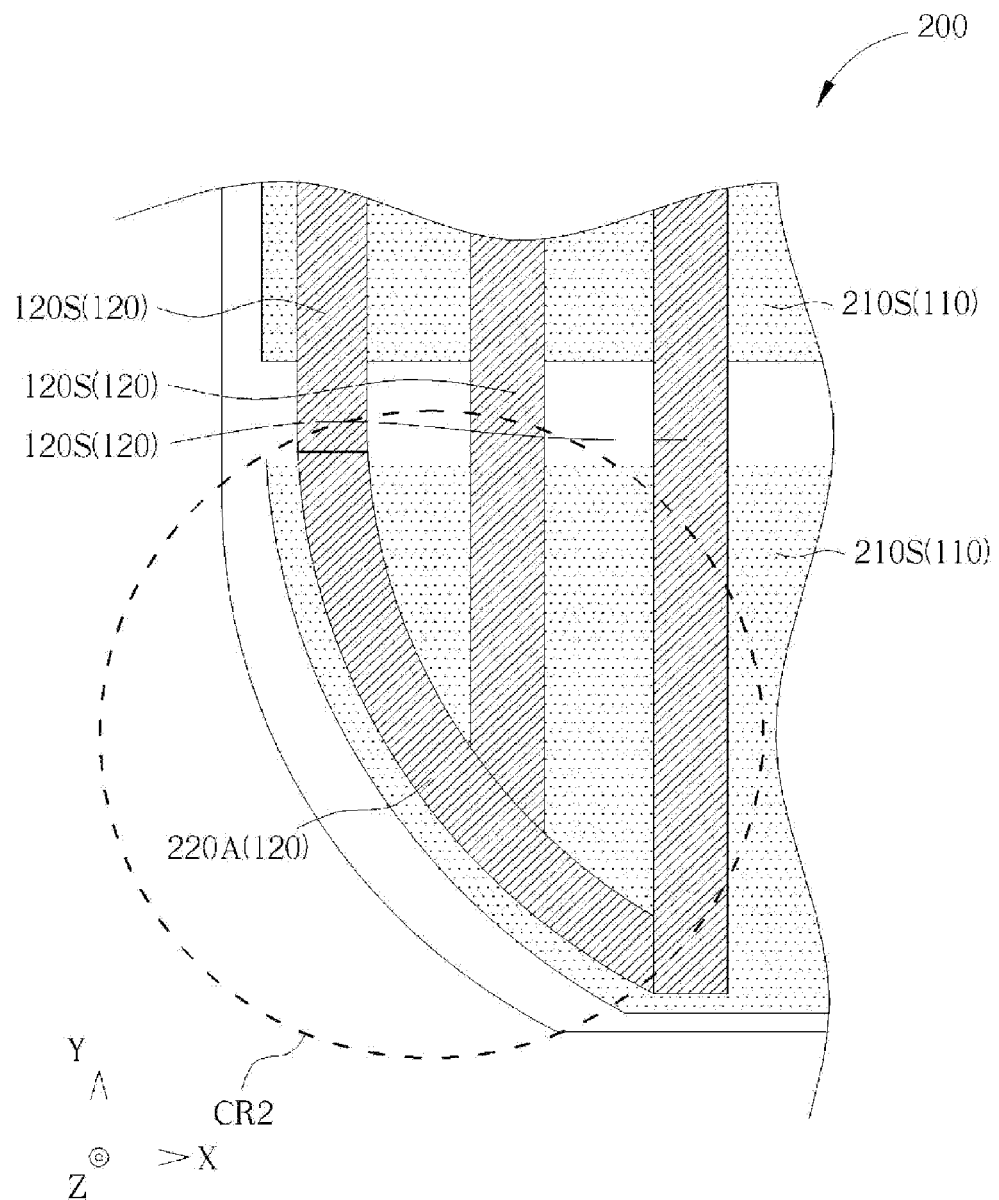
FIG. 6 is a schematic diagram illustrating a touch panel according to a fourth preferred embodiment of the present invention.

Please refer to FIG. 6. FIG. 6 is a schematic diagram illustrating a touch panel according to a fourth preferred embodiment of the present invention. As shown in FIG. 6, a touch panel 200 is provided in this exemplary embodiment. The difference between the touch panel 200 and the touch panel 100 of the first preferred embodiment is that the touch panel 200 has a non-right angle corner region CR2 on a corner of the touch panel 200, and the non-right angle corner region CR2 is an arc corner region. The first electrode 110 includes a plurality of first stripe electrodes 210S, and the second electrode 120 includes a plurality of second stripe electrodes 120S and an auxiliary electrode 220A. The auxiliary electrode 220A is disposed on the non-right angle corner region CR2, and the auxiliary electrode 220A is preferably an arc auxiliary electrode which corresponds to the profile or the shape of the non-right angle corner region CR2, but not limited thereto. Furthermore, a corner of the first stripe electrode 210S could also be an arc corner to correspond to the non-right angle corner region CR2 according to design requirements. Apart from the non-right angle corner region CR2, the auxiliary electrode 220A and the first stripe electrode 210S in the touch panel 200 in this embodiment, the other components, allocations, material properties and method of activating touch sensing of this embodiment are similar to those of the touch panel 100 in the first preferred embodiment detailed above and will not be redundantly described.

Figure 7:
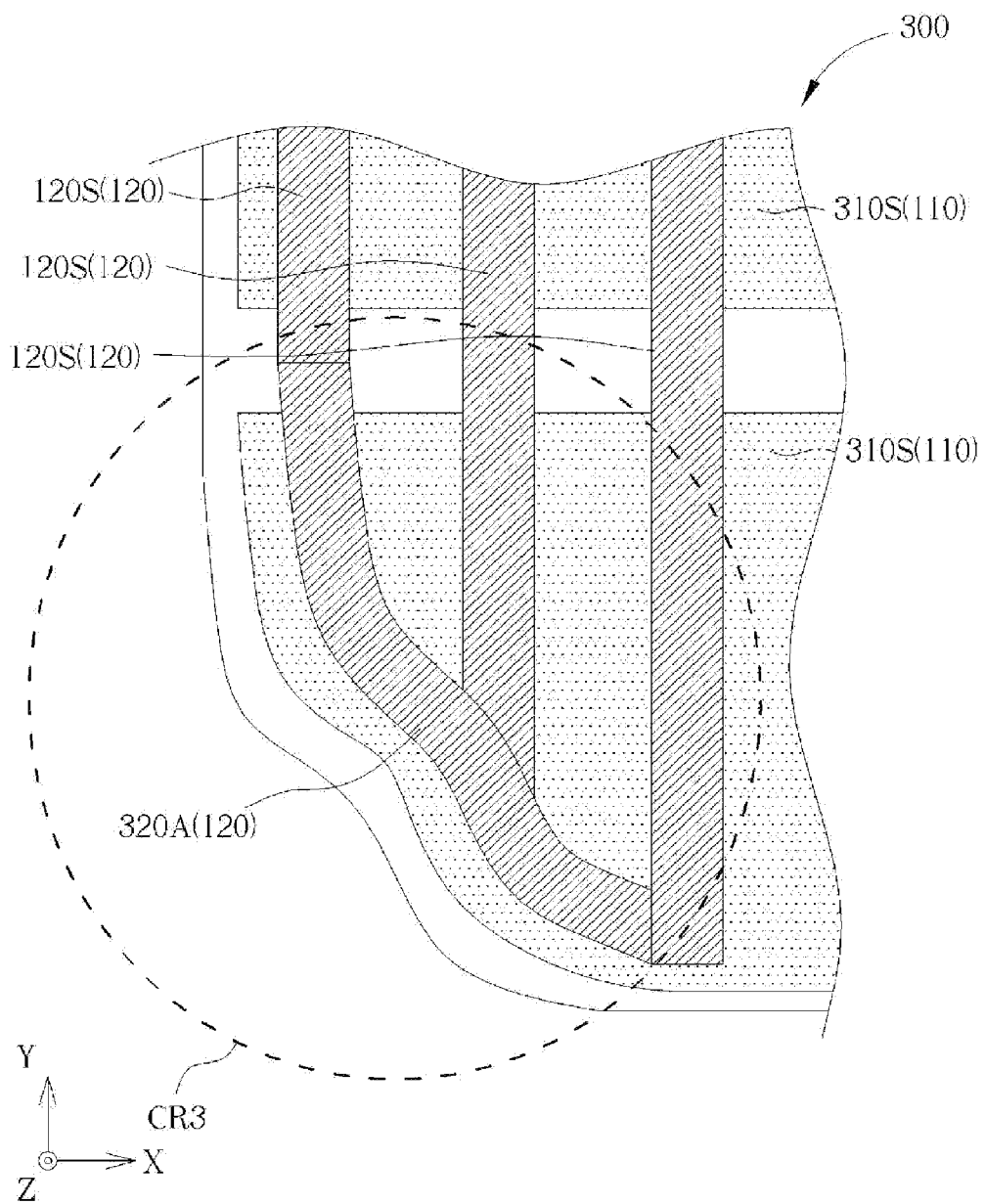
FIG. 7 is a schematic diagram illustrating a touch panel according to a fifth preferred embodiment of the present invention.

Please refer to FIG. 7. FIG. 7 is a schematic diagram illustrating a touch panel according to a fifth preferred embodiment of the present invention. As shown in FIG. 7, a touch panel 300 is provided in this exemplary embodiment. The difference between the touch panel 300 and the touch panel 100 of the first preferred embodiment is that the touch panel 300 has a non-right angle corner region CR3 on a corner of the touch panel 300, and the non-right angle corner region CR3 has an irregular shape. The first electrode 110 includes a plurality of first stripe electrodes 310S, and the second electrode 120 includes a plurality of second stripe electrodes 120S and an auxiliary electrode 320A. The auxiliary electrode 320A is disposed on the non-right angle corner region CR3, and the auxiliary electrode 320A is preferably an irregular shaped auxiliary electrode which corresponds to the profile or the shape of the non-right angle corner region CR3, but not limited thereto. Furthermore, a corner of the first stripe electrode 310S could also be an irregular shaped corner to correspond to the non-right angle corner region CR3 according to design requirements. Apart from the non-right angle corner region CR3, the auxiliary electrode 320A and the first stripe electrode 310S in the touch panel 300 in this embodiment, the other components, allocations, material properties and method of activating touch sensing of this embodiment are similar to those of the touch panel 100 in the first preferred embodiment detailed above and will not be redundantly described.

In conclusion, the auxiliary electrode is disposed on the non-right angle corner region of the touch panel in the present invention in order to increase the overlapped area between the first electrode and the second electrode on the non-right angle corner region; accordingly, the capacitance exhibited on the non-right angle corner region of the touch panel can increase to further improve the touch sensitivity of the touch panel. Moreover, the shapes of the auxiliary electrodes can be modified to correspond to different shaped non-right angle corner regions for obtaining the sufficient capacitance. The second electrode includes a plurality of second electrode sets, and each of the second electrode sets includes at least two adjacent second stripe electrodes and the corresponding connecting electrode. The connecting electrode is used to make the at least two adjacent second stripe electrodes electrically connected to each other for improving the uniformity of the electrical performance of the driven second electrodes. Additionally, a width of each of the second stripe electrodes is preferably substantially smaller than a width of each of the first stripe electrodes to reduce the coupled capacitance between the first electrode and the second electrode; accordingly, the consumed time for discharging the coupled capacitance between the first electrode and the second electrode is shorter, and the delays in the delivering the sensing signals can be avoided.

Those skilled in the art will readily observe that numerous modifications and alterations of the device and method may be made while retaining the teachings of the present invention. Accordingly, the above disclosure should be construed as limited only by the metes and bounds of the appended claims.

What is claimed is:

1. A touch panel having at least one non-right angle corner region on a corner of the touch panel, comprising:
   a first electrode comprising a plurality of first stripe electrodes extending along a first direction; and
   a second electrode, comprising: a plurality of second stripe electrodes extending along a second direction, wherein the second direction crosses the first direction, and the second electrode is electrically isolated from the first electrode; and
   at least one auxiliary electrode disposed on the non-right angle corner region, wherein an included angle between at least a part of the auxiliary electrode and the second direction is less than 90 degrees, and the auxiliary electrode is electrically connected to at least two of the second stripe electrodes adjacent to the auxiliary electrode.

2. The touch panel according to claim 1, wherein a width of each of the second stripe electrodes is substantially smaller than a width of each of the first stripe electrodes.

3. The touch panel according to claim 1, wherein the auxiliary electrode comprises a stripe electrode, an arc electrode or an irregularly shaped electrode.

4. The touch panel according to claim 1, wherein the non-right angle corner region comprises a bevel corner region, an arc corner region or an irregularly shaped corner region.

5. The touch panel according to claim 1, wherein the second electrode further comprises at least one connecting electrode and the connecting electrode is electrically connected to at least two adjacent second stripe electrodes.

6. The touch panel according to claim 5, wherein the connecting electrode extends along the first direction.

7. The touch panel according to claim 5, wherein the second electrode comprises at least one second electrode set, and the second electrode set comprises at least two adjacent second stripe electrodes and a corresponding connecting electrode.

8. The touch panel according to claim 1, further comprising a first substrate, wherein the first electrode and the second electrode are respectively disposed on two opposite surfaces of the first substrate.

9. The touch panel according to claim 1, further comprising a first substrate, wherein the first electrode and the second electrode are disposed on a same surface of the first substrate, and an insulating layer is disposed between the first electrode and the second electrode.

10. The touch panel according to claim 1, further comprising a first substrate and a second substrate disposed oppositely, wherein the first electrode is disposed on a surface of the first substrate facing the second substrate, and the second electrode is disposed on a surface of the second substrate facing the first substrate.

11. The touch panel according to claim 10, further comprising an adhesive layer disposed between the first electrode and the second electrode.

12. The touch panel according to claim 1, wherein the first electrode comprises a touch signal driving electrode, and the second electrode comprises a touch signal sensing electrode.

13. The touch panel according to claim 1, wherein the first direction is perpendicular to the second direction.

14. The touch panel according to claim 1, further comprising:
a substrate having one non-right corner region on a corner of the touch panel.

15. The touch panel according to claim 1, wherein included angles between at least a part of the auxiliary electrode in respect to the first direction and the second direction are respectively less than 90 degrees.

16. The touch panel according to claim 1, wherein the auxiliary electrode is overlapped with a one of the first stripe electrodes.

17. The touch panel according to claim 1, wherein the auxiliary electrode is electrically isolated from one of the first stripe electrodes.

18. The touch panel according to claim 1, wherein the auxiliary electrode is disposed along an outer edge of the non-right angel corner region.

19. The touch panel according to claim 5, wherein the second stripe electrodes, the auxiliary electrode and the connecting electrodes of the second electrode are integrally formed.

20. A touch panel, comprising:
a planar substrate having at least one non-right angel corner region on a corner of the touch panel;
a first electrode comprising a plurality of first stripe electrodes, extending along a first direction; and
a second electrode comprising a plurality of second stripe electrodes, extending along a second direction, wherein the second direction crosses the first direction, and the second electrode is electrically isolated from the first electrode; and
at least one auxiliary electrode disposed on the non-right angle corner region and electrically connected to at least one of the second stripe electrodes adjacent to the auxiliary electrode, wherein an included angle between at least a part of the auxiliary electrode and the second electrode stripe electrodes is less than 90 degrees.

* * * * *